United States Patent [19]

Righi

[11] Patent Number: 4,818,090

[45] Date of Patent: Apr. 4, 1989

[54] REAR-VISION MIRROR FOR AUTOVEHICLES

[75] Inventor: Nardino Righi, Milan, Italy

[73] Assignee: Com. Mer Italia S.p.A., Milan, Italy

[21] Appl. No.: 149,661

[22] Filed: Jan. 28, 1988

[30] Foreign Application Priority Data

Feb. 11, 1987 [IT] Italy ............................... 12418 A/87

[51] Int. Cl.$^4$ ............................................... G02B 7/18
[52] U.S. Cl. ..................................... 350/634; 350/636
[58] Field of Search ............... 350/633, 634, 636, 637;
248/479, 481–487

[56] References Cited

U.S. PATENT DOCUMENTS

| | | | |
|---|---|---|---|
| 4,171,873 | 10/1979 | Repay et al. | 350/634 |
| 4,202,603 | 5/1980 | Miyauchi | 350/634 |
| 4,247,172 | 1/1981 | Wunsch et al. | 350/636 |
| 4,504,117 | 3/1985 | Mittelhauser | 350/634 |
| 4,678,295 | 7/1987 | Fisher | 350/634 |
| 4,693,571 | 9/1987 | Kimura et al. | 350/634 |

*Primary Examiner*—John K. Corbin
*Assistant Examiner*—Martin Lerner
*Attorney, Agent, or Firm*—Larson and Taylor

[57] ABSTRACT

The driving units (AX,AY) comprise each an electric motor (14) which by means of a mechanical transmission (16,15,17,18,21,20) drives a rack (13) arranged substantially at right angles with the mirror holder (1), which is articulatingly connected thereto (at 113) and is guided in the housing (3) for the mirror holder (1). A control device (25) is provided which allows to move the mirror holder (1) into the required position by having it angularly moved by means of the two electric motors (14) around the one and/or the other pivot axis (X—X, Y—Y), and which also allows to store one or more positions of the mirror holder (1) and to have the same automatically moved into one or the other of these stored positions by means of a selecting respective control and with the aid of detectors (24) of the angular position of the mirror holder (1) around each one of the two pivot axes (X—X, Y—Y). According to the invention, the detector of the angular position of the mirror holder (1) in relation to each pivot axis (X—X, Y—Y) is in form of a potentiometer (24) the actuation of which is derived from a member (20) of the drive between the electric motor (14) and the rack (13) associated with the respective pivot axis, the rack (13) being not disengageably connected to the member (20) for actuating the potentionmeter (24), while in the drive between the member (20) for actuating the potentiometer (24) and the respective electric motor (14) a friction coupling (21) is interposed.

4 Claims, 3 Drawing Sheets

REAR-VISION MIRROR FOR AUTOVEHICLES

SUMMARY OF THE INVENTION

The invention refers to rear-vision mirrors for autovehicles, in which the mirror holder is angularly movable relatively to a housing (3) around a vertical pivot axis and around a horizontal pivot axis, by means of two driving units which are accomodated in the mirror holder housing and are each associated with one of the said two pivot axes, and these driving units comprise each an electric motor which by means of a mechanical transmission drives a rack arranged substantially at right angles with the mirror holder, which is articulatingly connected thereto and is guided in the mirror holder housing, the two electric motors being connected to a control device which allows to move the mirror holder into the required position by having it angularly moved by means of the electric motors around the one and/or the other pivot axis, and which also allows to store one or more positions of the mirror holder and to have the same automatically moved into one or the other of these stored positions by means of a selecting respective control and with the aid of detectors of the mirror holder angular position around each one of the two pivot axes.

The invention aims to improve a rear-vision mirror of the above type so as to allow a precise and accurate detection of the actual angular positions of the mirror holder around the two pivot axes, with the aid of means of a simple and economical construction and notwithstanding that the mirror holder can be freely moved by hand, or owing to any accidental causes.

This problem is solved by the invention by the feature that the detector of the mirror holder angular position relatively to each pivot axis is in form of a potentiometer, the actuation of which is derived from a member of the drive between the electric motor and the rack associated with the respective pivot axis, the rack being not disengageably connected to the member for actuating the potentiometer, while in the drive between the said potentiometer actuating member and the respective electric motor, a friction coupling is interposed.

Therefore, according to the invention, the actual angular position of the mirror holder relatively to each one of the two axes around which the said holder is pivoted, is detected and communicated to the electronic control unit by means of a respective potentiometer, with the member for actuating the same being, on one hand, not disengageably connected to the respective mirror holder-moving rack and, on the other hand, to the driving respective electric motor by means of a friction coupling. Thus, through the respective rack this potentiometer ever detects with the utmost accuracy the real angular position of the mirror holder, even when the mirror holder is moved either manually or accidentally, and such a manual or accidental movement of the mirror holder is freely possible thanks to the friction coupling which is inserted between the electric motor and the member for actuating the potentiometer, and which by slipping then permits to have the electric motor disengaged with a certain effort from the rack and the potentiometer, while the mutual connection of said rack and potentiometer is being maintained.

Each position-detecting potentiometer and the drive between each electric motor and the potentiometer and rack associated with said motor, as well as the friction coupling between the electric motor on one side and the potentiometer and rack on the other side, may be carried out according to a number of different constructions.

BRIEF DESCRIPTION OF THE DRAWINGS

One preferred embodiment of the invention is shown in the accompanying drawings and will be described hereinafter merely by way of a non-limiting example. In the drawings.

DESCRIPTION OF THE PREFERRED EMBODIMENTS

Figure 2:
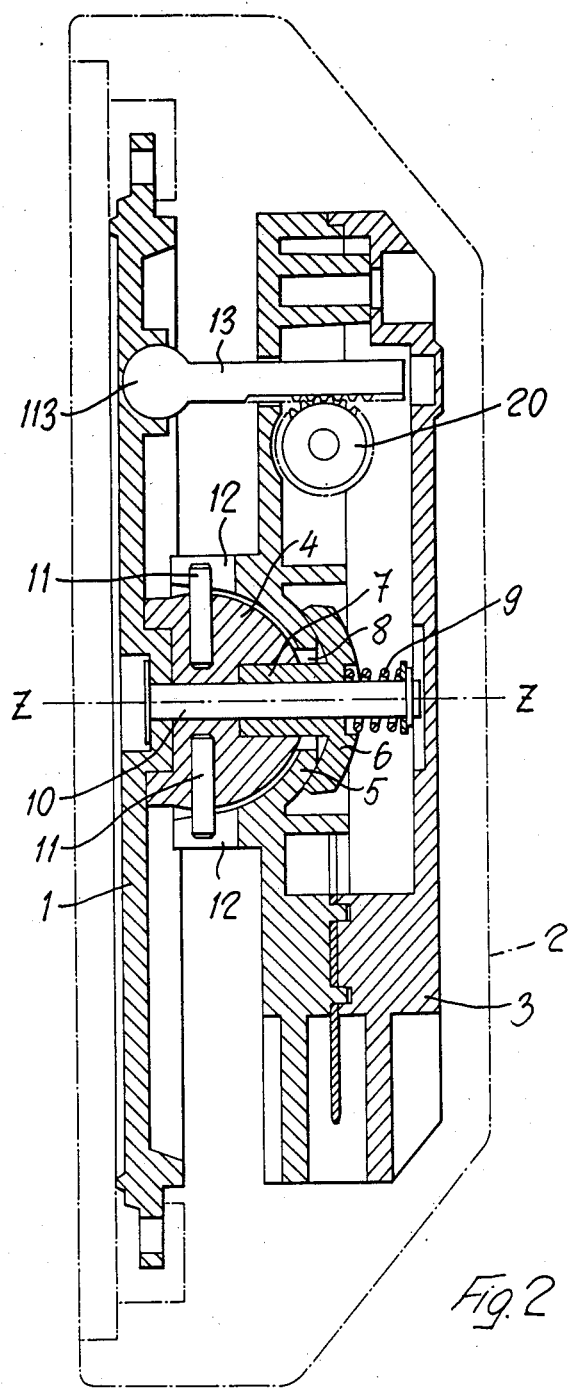
FIG. 2 is a cross-sectional view of the rear-vision mirror, taken on line II—II of FIG. 1.

Referring to the figures, by numeral 1 there is designated the mirror holder to which any suitable rear-vision mirror (not shown) is fastened in any appropriate manner. The mirror holder 1 is so mounted in a box-like housing 3 as to be angularly movable around a horizontal axis X—X and a vertical axis Y—Y, and the said housing may be in turn accomodated in and attached to any suitable casing 2 shown by dash-and-dot lines in FIG. 2. In order to have the mirror holder 1 articulatingly fitted in the housing 3, the mirror holder 1 is provided on its rear side with a ball-like projection 4 which is received in a matching round cradle 5 being integral with the housing 3. The rear side of the round cradle 5 which lies opposite to the ball-like member 4 of the mirror holder 1 also has a round shape, and against the said rear side three bears a round clamping member 6 provided with a central hub 7 which is freely passed through a bore 8 in cradle 5 and is slidably fitted in a respective bore provided in the ball-like member 4. The round clamping member 6 is elastically urged toward the ball-like member 4 by a pressure spring 9 which is fitted between the rear side of said clamping member 6 and the one head of a pin 10 which is centrally passed through the clamping member 6 and its hub 7 and also through the ball-like member 4 and the mirror holder 1, against which the said pin frontally bears by means of its other head. Thus, the cradle 5 which is integral with the housing 3, is elastically clamped between the ball-like member 4 of the mirror holder 1 and the round clamping member 6, whereby the mirror holder (1) is fixed against the housing 3.

Two diametrically opposite pins 11 located in a vertical plane project radially from the ball-like member 4 made integral with the mirror holder, and are engaged in respective vertical guide slots 12 provided in the housing 3. The rotation is thus prevented of the mirror holder 1 around the horizontal axis Z—Z which is perpendicular thereto (FIG. 2), however without this being prejudicial to the angular movements of the mirror holder 1 around the other two axes X—X and Y—Y (FIG. 1).

Two motorized driving units AX and AY are provided for obtaining the said angular movements of the mirror holder 1, and these units comprise each a rack 13 arranged substantially at right angles with the mirror holder 1 and which are articulatingly connected to said holder by means of a ball joint 113.

Figure 1:
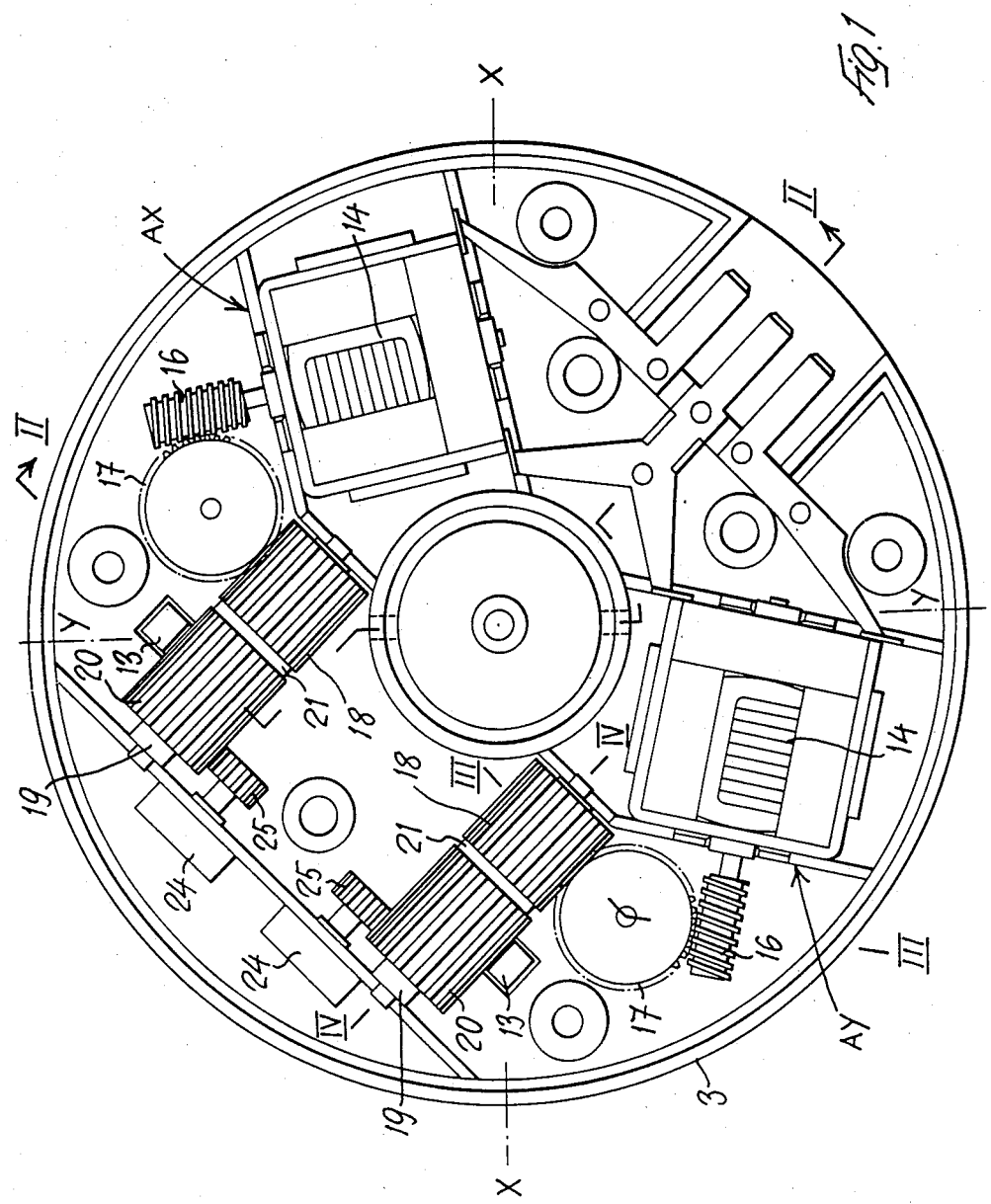
FIG. 1 is a plan view showing the opened housing carrying the mirror holder of a rear-vision mirror according to the invention.

The driving unit AX controls the angular movement of the mirror holder 1 around the axis X—X, and its rack 13 is then located in correspondence of the axis Y—Y, while the driving unit AY controls the angular movement of the mirror holder 1 around the axis Y—Y, and its rack 13 is then located in correspondence of the axis X—X, as it clearly appears in FIG. 1.

Figure 4:
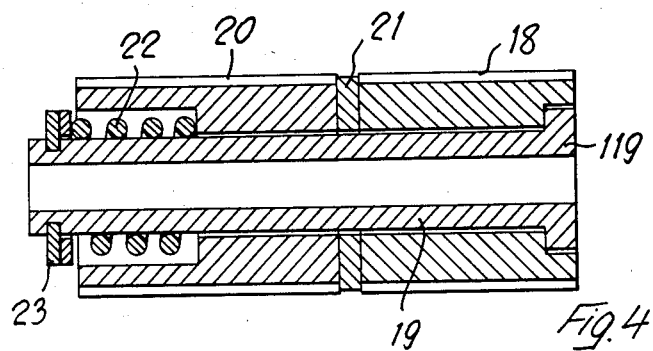
FIG. 4 is a sectional view in an enlarged scale, taken on line IV—IV of FIG. 1, showing the friction coupling arranged between each driving electric motor and the associated potentiometer and rack.
Figure 3:
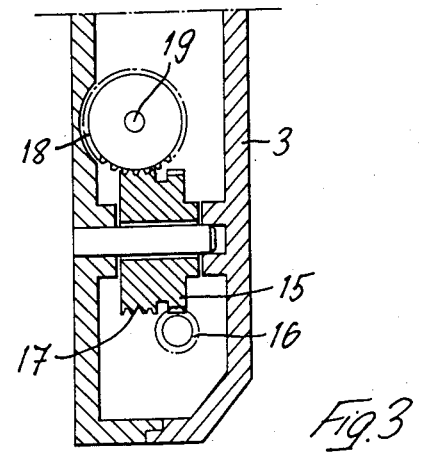
FIG. 3 shows a detail of the drive between one of the driving electric motors and the associated potentiometer and rack, in a sectional view taken on line III—III of FIG. 1.

The two driving units AX and AY are like units, so that only one of them will be described hereinafter. Each unit AX, AY comprises an electric motor 14 which through a worm screw drives a driving gear 15 (FIGS. 1 and 3). The driving gear 15 is integral with a worm screw 17 in mesh with a gear 18 which is mounted for a free rotation about a tubular shaft 19 which in turn is rotatably mounted on a shaft (not shown) fixed in the housing 3. Co-axially to the gear 18 another gear 20 is mounted for a free-rotation about the same shaft 19 (FIGS. 1 and 4). A friction material disc 21 is interposed between the facingly arranged side ends of the two gears 18, 20, and the two gears are pressed against each other (with the interposition of the friction disc 21) and against an enlarged head 119 at one end of the tubular shaft 19 through the action of a pressure spring which reacts by abutting against a circlip 23, or the like, fitted on the end of the tubular shaft 19 which is opposite to the head 119. Thus, between the two co-axial gears 18 and 20 a friction coupling which is obtained, is capable to transmit a predetermined maximum torque, but which will slip whenever it encounters a high resistance. The rack 13 that is associated with the respective driving unit AX or AY is in mesh with the gear 20, and the same is so guided in the housing 3 (FIGS. 1 and 2) that it cannot become disengaged from the respective gear 20. A potentiometer 24 is associated with each driving unit AX, AY, and by means of a pinion 25 the said potentiometer is coupled to the gear 20 (FIG. 1).

The potentiometers 24 may be made in any suitable manner, particularly as rotary potentiometers, according to one of the large number of different embodiments known to those skilled in the art.

Each potentiometer 24 acts as a detector of the angular position of the mirror holder 1 with respect to the associated axis X—X or Y—Y.

Figure 5:
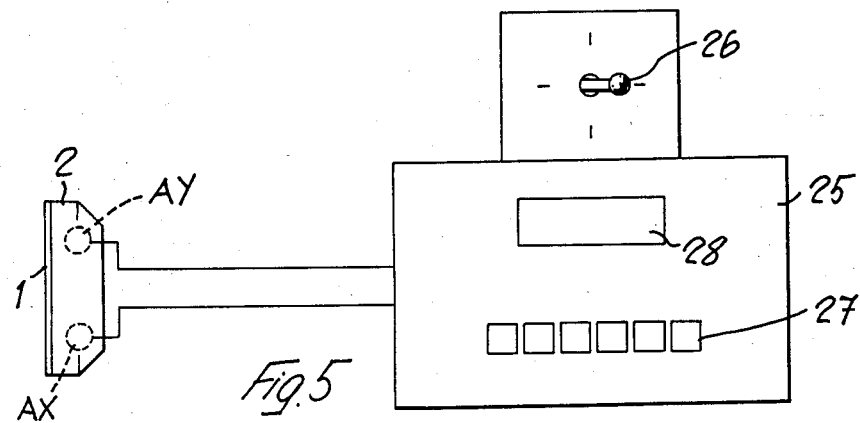
FIG. 5 diagrammatically shows the sort of control of the rear-vision mirror according to FIGS. 1 to 4.

The mirror holder 1 is moved and set into the required position by means of a control device 25 very diagrammatically shown in FIG. 5, to which there are connected the electric motors 14 and the potentiometers 24 of the two driving units AX and AY that are represented by two dash-and-dot line circlets in FIG. 5.

The control device 25 comprises manual control means for selectively actuating the two electric motors 14 of the two driving units AX, AY in the one or the other direction, so as to have the mirror holder angularly moved at will, over the desired angle, around the horizontal axis X—X and/or around the vertical axis Y—Y, either upwardly or downwardly, or to the left or to the right. These manual control means may be of any suitable type, and the same may, for example, consist of a directional multiple switch 26 which from a central off position is movable either upwardly or downwardly in order to obtain a corresponding angular movement of the mirror holder 1 around the horizontal axis X—X, or to the left or to the right in order to obtain a corresponding angular movement of the mirror holder 1 around the vertical axis Y—Y. Of course, any equivalent key or pushbutton control means may be provided in place of the said switch 26.

The control device 25 is so made that one or generally two or more positions of the mirror holder 1 can be stored and obtained at will simply by means of a position-recalling control. The storage and the recalling of the desired positions of the mirror holder 1 are effected with the aid of a display 28 and of a key strip 27 as well as with the aid of the two potentiometers 24 performing the function of detectors for detecting the position of the mirror holder 1. From the foregoing specification it clearly appears that each potentiometer 24 is always kinematically coupled in a positive (desmodromic) manner to the mirror holder 1 through the pinion 25, the gear 20, and the rack 13 which is always kept in mesh with the said gear 20. Therefore, the two potentiometers 24 always deliver to the control device 25 an information which exactly corresponds to the real position of the mirror holder 1, even when the same has been moved either manually or accidentally. This manual or accidental movement of the mirror holder 1 is actually possible thanks to the friction coupling 21 provided between the two co-axial gears 18 and 20, since it slips and allows the rack 13 and the potentiometer 24 to become disengaged from the irreversible driving pairs 17-18 and 16-15 and from the electric motor 14, while the positive connection between the rack 13 and the potentiometer 24 is being maintained.

Of course the invention is not limited to the shown embodiment, and the same may be widely changed and modified, the more so in construction, and for example with regard to the embodiment of the drive between each electric motor 14 and the rack 13 and to the connection of the associated potentiometer 24 with the said drive and with the rack, as well as with regard to the embodiment of the friction coupling provided in said drive. The invention may be applied to internal or external rear-vision mirrors, and also to rear-vision mirrors for any type of vehicles.

I claim:

1. A mirror device for an automobile comprising:
a housing including a planar mirror holder and a mounting means for mounting said mirror holder in said housing for angular movement about a horizontal pivot axis and a vertical pivot axis;
a vertical driving unit means and a horizontal driving unit means mounted in said housing for respectively moving said mirror holder about the respective vertical and horizontal axes, each said driving unit means including an electric motor, a rack articulatingly attached at one end to said mirror holder, a guide through which said rack slidably extends at a right angle to said mirror holder, and a mechanical transmission means for transmitting a driving force between said electric motor and said rack, said mechanical transmission means including (a) a member located between said electric motor and said rack with said rack permanently connected to said member such that any movement of said rack also causes a movement of said member and (b) a friction coupling means between said member and said electric motor for drivingly coupling said member to said electric motor frictionally while allowing said member to move free of said electric motor when the friction coupling is overcome;

a respective angular detecting means associated with each said driving unit for detecting the angular position of said mirror holder about the respective axis, each said angular detecting means including a potentiometer which is directly driven by movement of said member; and a control means for controlling the position of said mirror holder, said control means including a motor actuation means for controlling the actuation of said electric motors, a storage means connected to said potentiometers for storing at least one position of said mirror holder, and a positioning means associated with said storage means and said potentiometer for automatically returning said mirror holder to said at least one stored position.

2. A mirror device as claimed in claim 1 wherein said mechanical transmission means includes a shaft and a gear rotatably mounted thereon and connected to said electric motor, wherein said member is a gear which is also rotatably mounted on said shaft, and wherein said friction coupling means includes a friction material disc disposed between said grears and an urging means for elastically urging said gears toward one another to sandwich said friction material disc therebetween.

3. A mirror device as claimed in claim 1 wherein said mirror holder includes on a rear side thereof a ball-like projection which is received in a matching round cradle provided in said housing; and characterized in that a matching round clamping member is connected to said ball-like projection in said mirror holder and elastically bears against said cradle.

4. A mirror device as claimed in claim 3, characterized in that said ball-like projection in said mirror holder and said round clamping member are urged toward each other by a spring, so that they elastically clamp therebetween said round cradle.

* * * * *